United States Patent [19]

Westcott et al.

[11] 3,910,813

[45] Oct. 7, 1975

[54] TREATING WASTE PAPER CONTAINING PRESSURE RUPTURABLE MICROCAPSULES TO RECOVER THE INTERNAL PHASE OF THE MICROCAPSULES

[75] Inventors: Lawrence Westcott, Cefn Cribwr, near Bridgend; Kenneth John Brinkworth, Penarth, both of Wales

[73] Assignee: Wiggins Teape Research & Development Limited, London, England

[22] Filed: Oct. 16, 1973

[21] Appl. No.: 406,850

[30] Foreign Application Priority Data
Nov. 2, 1972 United Kingdom............... 50576/72

[52] U.S. Cl.................... 162/5; 68/18 R; 68/20; 68/158; 68/181 R; 134/73; 162/191; 252/316
[51] Int. Cl.²......................................... D21C 5/02
[58] Field of Search........... 162/5, 191, 237, 162, 4; 68/158, 181 R, 18 R, 18 C, 20; 134/73, 74, 75, 10, 12; 252/316

[56] References Cited
UNITED STATES PATENTS

| | | | |
|---|---|---|---|
| 2,425,335 | 8/1947 | Messing et al. | 162/237 |
| 2,703,754 | 3/1955 | Myers | 162/5 |
| 2,746,862 | 5/1956 | McDonald | 134/12 |
| 3,058,871 | 10/1962 | Davis et al. | 162/5 |
| 3,135,651 | 6/1964 | Staretr | 162/237 |
| 3,253,976 | 5/1966 | Bocci | 162/5 |
| 3,549,483 | 12/1970 | Fair | 162/237 |

FOREIGN PATENTS OR APPLICATIONS

| | | | |
|---|---|---|---|
| 239,925 | 7/1962 | Australia | 134/12 |
| 949,910 | 2/1964 | United Kingdom | 252/316 |

OTHER PUBLICATIONS
Abstract Bulletin Institute of Paper Chemistry, Vol. 40, No. 3, 9–69, No. 388, No. 2.50.

*Primary Examiner*—Leon S. Bashore
*Assistant Examiner*—William F. Smith
*Attorney, Agent, or Firm*—Burns, Doane, Swecker & Mathis

[57] ABSTRACT

The internal phase and paper fibres of waste capsule-coated paper is reclaimed by disposing in a container a batch of the paper the density of which is such as to permit the flow of a solution between strips forming the batch, removing the internal phase by pumping into the container a solvent capable of penetrating the walls of the capsules and which has a boiling point lower than that of the internal phase thereby to form an internal phase/solvent solution, then displacing the solution, distilling the solution to recover the solvent and the internal phase, and then removing the treated batch from the container.

12 Claims, 5 Drawing Figures

U.S. Patent  Oct. 7,1975  Sheet 1 of 3  3,910,813

TREATING WASTE PAPER CONTAINING PRESSURE RUPTURABLE MICROCAPSULES TO RECOVER THE INTERNAL PHASE OF THE MICROCAPSULES

BACKGROUND OF THE INVENTION

1. Field of the Invention

This invention relates to the treatment of waste capsule-coated paper to reclaim the paper fibres and internal phase contained in the capsules.

2. Description of the Prior Art

One kind of capsule-coated paper is that used with pressure-sensitive copying systems, such paper having a coating of pressure-rupturable micro-capsules made, for example of hydrophilic colloid material such as gelatine, and containing an internal phase of an oily solution of colourless chromogenic material, known as colour former, of basic reactant chemical properties. Such capsule-coated paper is used in conjunction with a further paper carrying a coating of a co-reactant material, such as attapulgite clay, acid treated montmorillonite clay, or particles of an oil-soluble, acid phenolic polymeric material capable of reacting with the colour former to form distinctive coloured marks.

Such systems and other capsule coated papers are well known and will not, therefore, be described in detail herein.

In the production of coated papers of the kind above referred to there is usually a considerable amount of waste, this being known in the art, and referred to hereinafter, as "broke". The value of the paper fibres and of the internal phase of the capsules which are lost as the result of the wastage is considerable and proposals which have been made for reclaiming such materials, and which have been based on a de-inking/bleaching process, have not been put into practice because of the high capital cost of installations for carrying out the process.

SUMMARY

It is a main object of the invention to provide a method of and apparatus for reclaiming paper fibres and internal phase from broke.

According to the invention there is provided a method of reclaiming internal phase and paper fibres from broke by disposing in a container a batch of strips of shredded broke the density of the batch being such as to permit the flow of solution between the strips, removing internal phase by pumping into the container a solvent which is capable of penetrating the walls of the capsules containing internal phase and which has a boiling point lower than that of the internal phase thereby to form an internal phase/solvent solution, displacing the solution from the container, recovering solvent and internal phase from the solution by distillation thereof, and removing the treated batch from the container.

In one embodiment of the invention the container is a substantially upright U-tube, the solvent is pumped through an inlet into one limb of the tube to flow through the tube and to overflow as an internal phase/solvent solution through an outlet in the other limb of the tube at a level lower than that of said inlet, and batches of shredded broke are moved in succession into and through the tube in a contradirection to that of the flow of solution.

In another embodiment the container is one of a series of containers each arranged to enclose a batch disposed in a foraminous holder and each arranged for connection to a source of solvent from which solvent can be pumped thereto and to a distillation plant to which internal phase/solvent can overflow, and each of of the containers in turn is dis-connected from the source of solvent and the distillation plant, drained, and provided with an untreated batch following removal of the treated batch from the container, and while one of the containers is disconnected overflowing internal phase/solvent solution from a second container to a third container by pumping solvent into the second container with concomitant overflow of residue internal phase/solvent solution from the third container.

In yet another embodiment the container is one of a plurality of containers each connectable with a distillation plant to which internal phase/solvent solution can overflow, to each of a first and second solution-containing tank, and to a source of solvent from which solvent can be pumped to the container, and the containers are used in turn to treat a batch by the steps of enclosing the batch in the container, pumping solution from the first tank into the container, pumping solution from the second tank into the container and overflowing solution from the container to the distillation plant, pumping solvent into the container and overflowing solution into the first tank, and draining the container and removing the treated batch therefrom.

DESCRIPTION OF THE PREFERRED EMBODIMENTS

Broke as taken from a coating machine is usually in the form of relatively long lengths and in order that the methods of reclamation according to the invention may be carried out the broke must be shredded into strips. It has been found that strips 2 to 3 inches wide and 12 inches long are satisfactory.

The shredded strips are formed into a batch the density of which is such as to permit the flow of solution between the strips and it has been found that a packing density of 0.1 kg/liter, which is the approximate packing density of uncompressed paper in strip form, is satisfactory and that if the batch is slightly compressed to have a packing density of 0.2 kg/liter the paper is easily "wetted out" with a solvent. The batch is disposed in a container and the internal phase removed from the capsules by pumping a solvent into the container with concomittant formation of an internal phase/solvent solution. The solvent, which should be miscible with water and preferably non-toxic, must be capable of penetrating the walls of the capsules and have a boiling point lower than that of the internal phase. Solvents containing at least one ketonic group are generally suitable and the preferred solvent is acetone.

Preferably the strips making up a batch are agitated while in contact with the solvent, and suitable agitation can be effected by means of air fed into the container under pressure.

The solution is displaced from the container and is passed to a distillation plant of known construction in which the solvent and internal phase are recovered from the solution by distillation.

Internal phase recovered from the distillation plant can be washed with water in order to remove any remaining traces of solvent therefrom, and can be further washed with caustic soda in order to remove any traces of rosin size which may have been picked up from the paper.

The treated batch is subsequently removed from the container and delivered to a baler, or preferably straight to a hydropulper, for re-use in the making of paper.

In the simplest form of the invention the batch is contained in a closed container into which solvent is continuously pumped until all internal phase is removed from the batch. This method, however, needs a large recovery plant and it is, therefore, preferred to use one of the methods described below.

Figure 1:
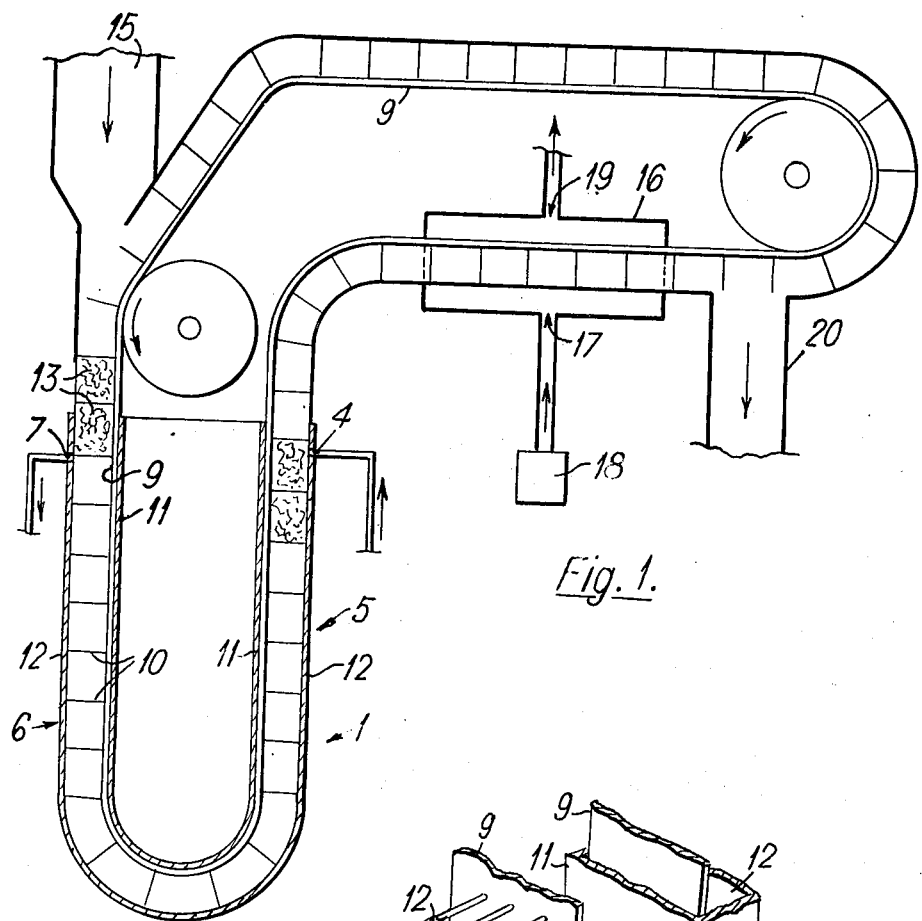
FIG. 1 illustrates an apparatus for the continuous reclamation of paper fibres and internal phase from broke.
Figure 2:
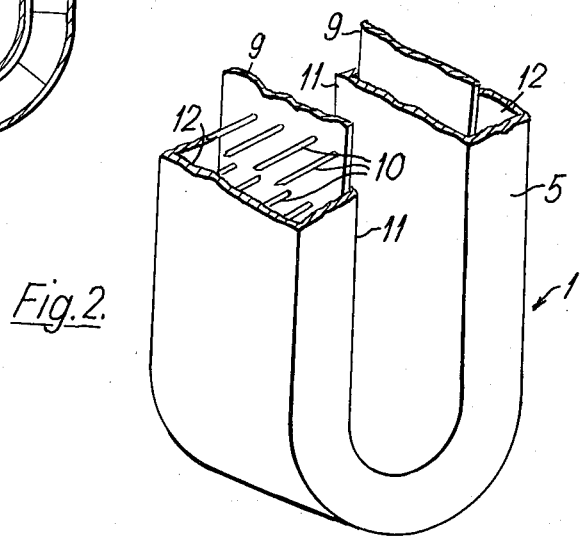
FIG. 2 illustrates a detail of FIG. 1.
Figure 3:
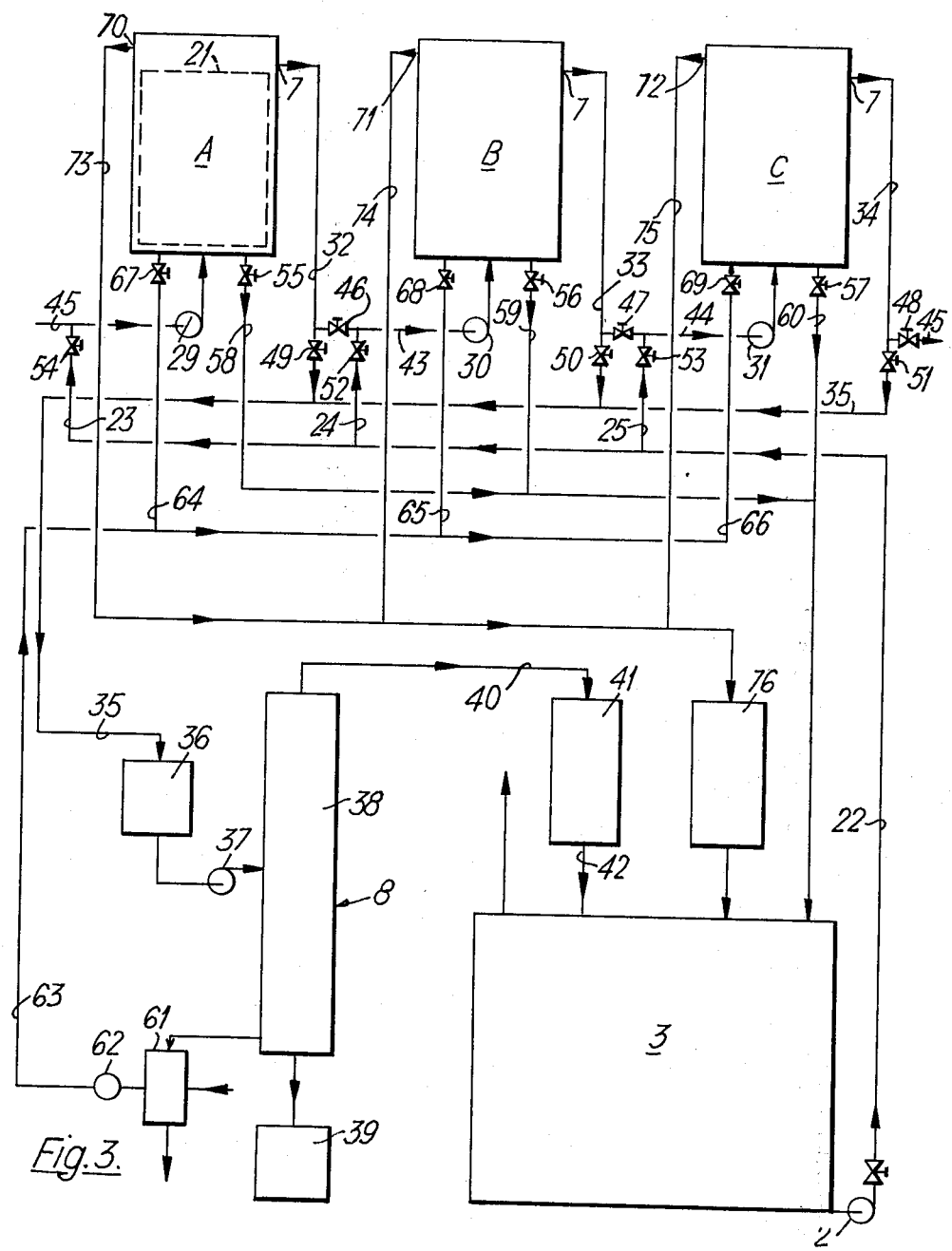
FIG. 3 illustrates an apparatus for continuously reclaiming paper fibres and internal phase from batches of broke.

Referring to FIG. 1, the container comprises a substantially upright U-tube 1 and solvent is pumped, as by a pump 2, FIG. 3, from a source 3 of solvent, through an inlet 4 into one limb 5 of the tube 1. The other limb 6 of the tube 1 is provided with an outlet 7 from which internal phase/solvent solution flows to a distillation plant 8 as diagrammatically illustrated in FIG. 3.

Either one or both of the limbs 5 and 6 of the tube 1 can be provided with pumped recirculation loops thereby to increase the effective flow of solution through the limbs 5 and 6 between the inlet 4 and the outlet 7.

An endless conveyor 9, driven by any suitable means now shown, is provided at equi-spaced intervals along the length of the conveyor with lines of prongs 10 transverse to the length of the conveyor. As can be seen from FIG. 1, the conveyor is arranged to move through the tube 1 in close proximity with one side 11 of the tube and the free ends of the prongs 10 in close proximity with a side 12 of the tube. Each pair of successive lines of prongs 10 are arranged to receive therebetween a batch 13 of strips of shredded broke issuing from the bottom of a chamber 15 to which the broke is delivered in any desired manner, for example by a cyclone, not shown. The prongs 10 move the batches 13 in succession into and through the tube in a contradirection to the flow of solution to the outlet 7. The conveyor may be moved with an intermittent movement but preferably the movement of the conveyor is continuous.

The level of the outlet 7 is lower than that of the inlet 4 and each batch 13 as it approaches the outlet end of the tube is washed with fresh solvent entering the tube through the inlet 4. The batches 13 leaving the tube are, therefore, soaked with solvent which is inflammable and to reduce the hazard of fire or explosion the batches are moved by the conveyor through a solvent extractor chamber 16. The chamber 16 is provided with an inlet 17 connected with a source 18 of heated nitrogen or other inert gas and with an outlet 19 through which solvent/nitrogen atmosphere from the chamber passes to a condenser, not shown. On leaving the chamber 16 the batches 13 are dropped into a chute 20 by which the batches can be delivered to a baler, or straight to a hydropulper, not shown.

Referring to FIG. 3, the apparatus comprises a series, three as shown, of containers A, B, and C each with a quick-release lid, not shown, and each arranged to enclose a batch disposed in a foraminous holder 21, for example a wire basket. The source 3 of solvent and pump 2 are connected to the containers by a line 22, lines 23, 24, 25, and pumps 29, 30, 31. The outlets 7 from the containers to the distillation plant 8 are connected through lines 32, 33, 34 and 35, with a receiver 36, pump 37, solvent evaporator 38 and internal phase receiver 39 forming part of the distillation plant. The evaporator 38 is connected by line 40 with a condenser 41 which, in turn is connected by line 42 with the source 3. The containers are also connected in series, to permit the flow of solution from one to another, by lines 43, 44, 45 and valves 46, 47, 48. The lines 32, 33, 34 are respectively connected with line 35 through valves 49, 50, 51 and lines 24, 25 and 23 are respectively connected with lines 43, 44, 45 by valves 52, 53, 54. The containers are drained through valves 55, 56, 57 and lines 58, 59, 60. Following draining of the containers, prior to opening thereof to permit removal of the holders 21 and the insertion into the containers of holders 21 containing untreated broke, and to reduce the risk of fire or explosion, heated inert gas, such as nitrogen, from a head exchanger 61 is pumped by pump 62 along line 63 and the appropriate one of lines 64, 65, 66 and valves 67, 68, 69 to the containers to remove solvent from the batch, the nitrogen or other inert gas/solvent atmosphere escaping from vents 70, 71, 72 and lines 73, 74, 75 to a condenser 76.

Each of the containers A, B, and C is in turn disconnected from the source 3 of solvent and the distillation plant 8, is drained, and the container so disconnected is provided with an untreated batch of shredded broke following removal of the treated batch from the container, and while one of the containers is so disconnected overflowing internal phase/solvent solution passes from a second container to a third container by pumping solvent into the second container and concomittant overflow of residue solution from the third container to the distillation plant.

The apparatus can be controlled manually but preferably is controlled automatically using a multi-position master switch, not shown, which determines the sequence of sequential operations as set out in the following table, the switch being, for three containers A, B, and C, a three-position switch:-

| Switch Position | Container A | Container B | Container C |
| --- | --- | --- | --- |
| 1 | Pump 29 stop; | Pump 30 continues | Pump 31 starts |
|  | Valves 54, 46 shut | Valves 52, 47 open | Valve 51 open |
|  | Valve 55 open After delay - Valve 55 shut Valve 67 open After delay - Valve 67 shut | Valve 50 shut |  |
| 2 | Pump 29 starts | Pump 30 stops | Pump 31 continues |
|  | Valve 49 open | Valves 52, 47 shut | Valve 51 shut |
|  |  | Valve 56 open | Valves 53, 48 open |

-Continued

| Switch Position | Container A | Container B | Container C |
| --- | --- | --- | --- |
|  |  | After delay - Valve 56 shut Valve 68 open After delay - Valve 68 shut |  |
| 3 | Pump 29 continues | Pump 30 starts | Pump 31 stops |
|  | Valve 49 shut | Valve 50 open | Valves 53,48 shut |
|  | Valves 54,46 open |  | Valve 57 open |
|  |  |  | After delay - Valve 57 shut Valve 69 open After delay - Valve 69 shut |

As an example of the mode of operation let it be assumed that container A is filled with untreated broke. The master switch is then set to position 2 so that pump 29 starts and valve 49 is open, pump 31 continues to operate with valve 51 shut and valves 53 and 48 open so that fresh solvent is pumped into container C and internal phase/solvent solution overflows along line 45 and is pumped into container A at a set flow rate, filling container A before there is overflow through valve 49 and line 35 to the distillation plant. The flow rate per hour must therefore be greater than twice the capacity of container A, otherwise there would be no overflow. Pump 30 stops, valves 52 and 47 shut, and valve 56 opens so that solution in container B, drains through valve 56 and line 59 to the solution source 3. After a delay, valve 56 shuts and valve 68 opens so that heated air is pumped into container B and is vented through line 74 to condenser 76. After a delay, valve 68 shuts and container B is opened, and treated batch is removed, and an untreated batch is placed in container B which is then again closed.

Figure 4:
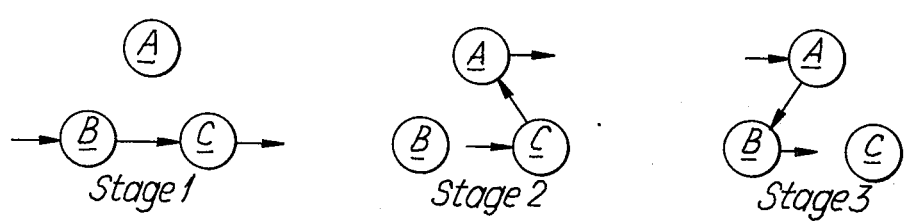
FIG. 4 is a schematic view illustrating the mode of operation of the apparatus of FIG. 3.

The sequential operation of the apparatus is illustrated in FIG. 4 which shows the three stages of an operating cycle, each stage of which lasts for 30 minutes. In stage 1 the container A is being recharged and fresh solvent is pumped to container B with overflow of solution to container C and overflow from container C to the distillation plant.

In stage 2 container B is being recharged and fresh solvent is pumped to container C with overflow of solution to container A and overflow from container A to the distillation plant.

In stage 3 container C is being recharged and fresh solvent is pumped to container A with overflow of solution to container B and overflow from container B to the distillation plant. The cycle is then repeated.

Each stage is timed to last 30 minutes and the containers are loaded with 500 kg. of mixed broke with a packing density of 0.2 kg/liter to have a volume of 2,500 liters. The volume of mixed broke alone, allowing for capsule volume and assuming an average density of 0.7 kg/liter, will be 682 liters. Thus the void volume to be filled will be 1,818 liters. The solvent flow rate required to fill two containers per hour, without overflow, will therefore be 3,636 liters per hour.

Assuming that the required concentration of internal phase in the effluent is 10% the solvent flow rate should be 567 liters per hour. This overflow to the distillation plant must be in excess of the flow required to fill the containers, thus the total solvent flow is 4,203 liters per hour. With this rate of solvent flow the cycle is as follows:-

| Time | Operation |
| --- | --- |
| Zero | Container A charged with untreated broke, solution flow at 4203 litres per hour starts. |
| + 26 mins. | Container A full, overflow to distillation plant starts, |
| + 30 mins. | Container B charged with untreated broke, overflow from container A to distillation plant stops, fresh solvent is pumped into container A. |
| + 56 mins. | Container B is full of solution displaced from container A. Containers A and B each overflow, A into B and B to distillation plant. |
| + 60 mins. | Container A ready for emptying and recharging. |

The flow to the distillation plant is, therefore, at a rate of 4,203 liters per hour, but the flow occurs only at time 26 to 30 minutes and time 56 to 60 minutes, that is 8 minutes per hour. Thus the total flow to the distillation plant is 567 liters per hour, and the internal phase concentration is 10%.

The pumping of fresh solvent into a container to displace solution already therein and effect washing of the broke is continued until the overflow is substantially free of internal phase so that recovery of internal phase is substantially 100%.

Figure 5:
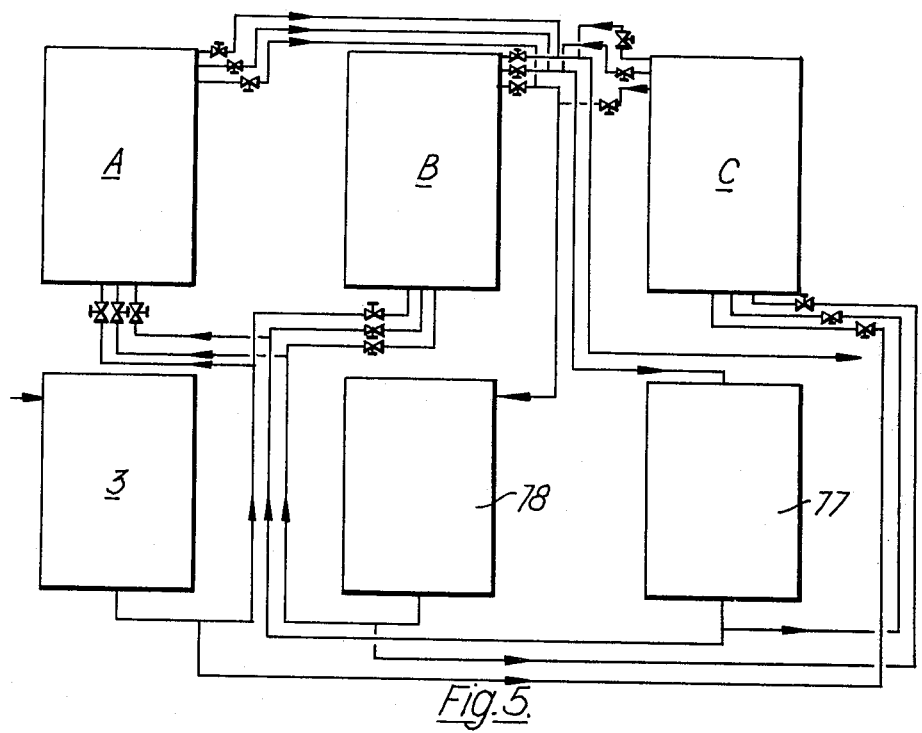
FIG. 5 illustrates an alternative apparatus for reclaiming paper fibres and internal phase from batches of broke.

FIG. 5 illustrates an apparatus suitable for carrying out the method according to the invention when the quantities of broke to be reclaimed are insufficient to warrant the use of a continuously operable installation.

In this apparatus at least two containers are each connected to a distillation plant and in the drawing three containers A, B and C are shown. A first solution-containing tank 77 and a second solution-containing tank 78 are each connected to each of the containers and valves, as indicated in FIG. 5, are selectively operable to control the flow of solvent to the containers, the flow of solution from and to the tanks 77, 78 and the flow of solution to the distillation plant.

Only one of the containers will be treated at any given time, the other containers then being cut off from the source of solvent, the tanks 77, 78, and the distillation plant.

Let it be assumed that the container B is to be treated. The container B, loaded with shredded broke, first has internal phase/solvent solution from a previous treatment of one of the containers pumped into it by a pump, not shown, from tank 77 to fill the container B and overflow to the distillation plant. Next, solution, also obtained from a previous treatment of the said one of the containers, is pumped by a pump, not shown, from tank 78 and the overflow from the container B is passed into tank 77. Next, fresh solvent is pumped from source 3 into the container B and the solution in the container B overflows into tank 78. The remaining solvent in the container B is then drained therefrom and the treated batch is removed from the container. To reduce the risk of fire or explosion, as described above, heated nitrogen or other inert gas can be admitted to, and vented from, the container following draining and before opening of the container.

By using the method according to the invention it is possible to reclaim for re-use from broke substantially the whole of the internal phase and paper fibres and this, it will be understood, results in a very considerable

We claim:

1. A method for treating waste paper broke comprising paper fibers and capsules having an internal phase material encapsulated within walls of the capsules to reclaim the internal phase material and the paper fibers and recover the internal phase material separate from the paper fibers, which method comprises:

disposing in a container a batch of strips of shredded broke, the density of the batch being sufficient to permit flow of a solution between the strips;

pumping into the container a solvent which is capable of penetrating the walls of the capusles containing the internal phase material and which solvent has a boiling point lower than that of the internal phase material;

allowing the solvent to flow between the strips and penetrate the walls of the capsules thereby to form an internal phase material-solvent solution in the container;

displacing the internal phase material-solvent solution from the container;

recovering the internal phase material and the solvent from the solution by distillation thereof;

removing the solvent-treated batch of strips from the container; and removing solvent from the solvent-treated batch of strips and recovering the paper fibers.

2. The method according to claim 1 in which the container is a substantially upright U-tube, the solvent is pumped through an inlet into one limb of the tube to flow through the tube and to overflow as an internal phase material solvent solution through an outlet in the other limb of the tube at a level lower than that of said inlet, and batches of shredded broke are moved in succession into and through the tube in a contra-direction to that of the flow of solution.

3. The method according to claim 2 in which the batches are moved with a continuous movement through the tube.

4. The method according to claim 2 including the steps of moving batches out of the U-tube through a solvent extraction chamber, passing hot inert gas into the chamber, permitting the flow of solvent and inert gas from the chamber, and recovering solvent by condensation.

5. The method according to claim 3 including the steps of moving the batches out of the U-tube through a solvent extraction chamber, passing hot nitrogen gas into the chamber, permitting the flow of solvent nitrogen gas from the chamber, and recovering solvent by condensation.

6. The method according to claim 1 in which the container is one of at least three containers each adapted to enclose a batch disposed in a foraminous holder and each adapted for connection to a source of solvent from which solvent can be pumped thereto and to a distillation zone to which internal phase material-solvent solution can overflow to the distillation zone, each of the containers in turn being disconnected from the source of solvent and the distillation zone, drained, and provided with an untreated batch following removal of the treated batch from the container, and while one of the containers is disconnected overflowing internal phase material-solvent solution from a second container to a third container by pumping solvent into the second container with concomittant overflow of residue internal phase material-solvent solution from the third container.

7. The method according to claim 5 including the step of purging the disconnected container with pressurised inert gas following draining and before opening of the container to remove the treated batch therefrom.

8. The method according to claim 1 in which the container is one of a plurality of containers each connectable with a distillation zone to which internal phase material solvent solution can overflow, to each of a first and a second solution-containing tank, and to a source of solvent from which solvent can be pumped to the container, and using the containers in turn to treat a batch by the steps of enclosing the batch in the container, pumping solution from the first tank into the container, pumping solution from the second tank into the container and overflowing solution from the container to the distillation zone, pumping solvent into the container and overflowing solution into the first tank, and draining the container and removing the treated batch therefrom.

9. The method according to claim 1 in which the solvent is acetone.

10. A method for treating waste paper broke comprising paper fibers and gelatin-walled capsules having an encapsulated internal phase of an oily solution of basic colorless chromogenic material to reclaim the internal phase and the paper fibers and recover the internal phase separate from the paper fibers, which method comprises providing a batch of strips of shredded broke, the density of the batch being sufficient to permit flow of a solution between the strips;

placing into contact with the batch a water-miscible solvent capable of penetrating the walls of the capsules and having a boiling point lower than that of the internal phase material, and allowing the solvent to flow between the strips and penetrate the walls of the capsules thereby to form a solution consisting of internal phase and solvent in the batch;

withdrawing the internal phase-solvent solution from the batch and recovering the internal phase by distilling the solution and extracting remaining solvent from the solvent-treated batch and recovering the paper fibers.

11. A method according to claim 10 wherein the capsules are coated on the broke and the solvent has at least one ketonic group.

12. A method according to claim 11 wherein the solvent is acetone.

* * * * *